(12) United States Patent
Vessels (10) Patent No.: US 12,420,216 B2
(45) Date of Patent: Sep. 23, 2025

(54) TERTIARY SEPARATION OF ALLULOSE FROM CORN SYRUP USING CHROMATOGRAPHY

(71) Applicant: Archer Daniels Midland Company, Decatur, IL (US)

(72) Inventor: Kevin Vessels, Decatur, IL (US)

(73) Assignee: ARCHER-DANIELS-MIDLAND COMPANY, Decatur, IL (US)

( * ) Notice: Subject to any disclaimer, the term of this patent is extended or adjusted under 35 U.S.C. 154(b) by 505 days.

(21) Appl. No.: 17/791,521

(22) PCT Filed: Jan. 11, 2021

(86) PCT No.: PCT/US2021/012936
§ 371 (c)(1),
(2) Date: Jul. 7, 2022

(87) PCT Pub. No.: WO2021/146134
PCT Pub. Date: Jul. 22, 2021

(65) Prior Publication Data
US 2023/0058087 A1      Feb. 23, 2023

Related U.S. Application Data

(60) Provisional application No. 62/960,225, filed on Jan. 13, 2020.

(51) Int. Cl.
*B01D 15/18* (2006.01)
*B01D 15/38* (2006.01)

(52) U.S. Cl.
CPC ....... *B01D 15/185* (2013.01); *B01D 15/1871* (2013.01); *B01D 15/3814* (2013.01)

(58) Field of Classification Search
CPC .............. B01D 15/185; B01D 15/1871; B01D 15/3814; A23L 27/33; A23L 33/125; A23P 30/00; A23V 2002/00; A23V 2250/606; A23V 2250/61; A23V 2300/18
See application file for complete search history.

(56) References Cited

FOREIGN PATENT DOCUMENTS

CN        102876817 A  *  1/2013

* cited by examiner

*Primary Examiner* — Waqaas Ali
(74) *Attorney, Agent, or Firm* — Andrew F. Nilles (57) ABSTRACT

The present invention advantages over conventional methods and products. In an aspect, a method comprises separating a mixture of allulose, fructose, glucose, and gluco-oligosaccharides, wherein the separating comprises using simulated moving bed chromatography, and recovering allulose at a high purity and yield. In an aspect, the simulated moving bed ("SMB") chromatography to separate a fraction enriched with allulose from a fraction enriched with fructose and glucose, and to separate a fraction enriched with fructose from a fraction enriched with glucose. In an aspect, the method provides separation of an allulose from a mixture of allulose, fructose, and D-glucose, wherein the mixture is produced from high fructose corn syrup ("HFCS") when HFCS is contacted with an allulose epimerase. In an aspect, the method produces a high quality allulose product. In an aspect, the fraction enriched with fructose can be recycled to contact the allulose epimerase.

17 Claims, 4 Drawing Sheets

TERTIARY SEPARATION OF ALLULOSE FROM CORN SYRUP USING CHROMATOGRAPHY

CROSS-REFERENCE TO RELATED APPLICATIONS

This application is a national stage entry of International Application No. PCT/US21/12936, filed Jan. 11, 2021, which itself claims priority to U.S. Provisional Patent Application No. 62/960,225, filed Jan. 13, 2020, the contents of each are incorporated herein by reference.

FIELD OF INVENTION

The present invention relates to a process for producing allulose from corn syrup using simulated moving bed chromatography.

BACKGROUND OF THE INVENTION

Allulose is a low caloric sweetener. Conventionally, allulose is typically formed by isomerizing fructose to allulose using an immobilized epimerase enzyme. Typically, about 15-30% of the fructose is converted to allulose by this method. Chromatographic fractionation has been used to separate allulose and fructose to produce high purity allulose. Dissolved crystalline fructose is the typical feed for enzyme conversion of fructose to allulose. To produce crystalline fructose requires a very high purity fructose stock being greater than 96% fructose by purity.

U.S. Pat. No. 10,342,247 discloses preparation of allulose from a crystalline fructose solution with a purity of about 99%. The patent discloses that a crystalline fructose was dissolved in water and the mixture was allowed to react with an epimerization enzyme at 55° C. with a regulated pH of 7.0 and after 40 hours of reaction, the syrup sample was collected having 25.2% allulose and 74.8% fructose as determined by a standard HPLC method. The patent discloses that this syrup was passed through microfiltration to remove insoluble cell mass containing the enzyme, then subject to carbon filtration to remove color, and then demineralization on a cation and anion ion exchange column to further remove minerals and other impurities. The patent discloses that the syrup was then concentrated to a dry solid of about 60% using conventional evaporator. The patent discloses that concentrated allulose syrup at 25.2% made with the above steps was passed through a simulated moving bed chromatograph column (SMB) with a calcium form resin, and the resulting syrup had an allulose content of 93%.

Important limitations to conventional methods are that crystalline fructose requires expensive and time-consuming processing to produce, and crystalline fructose is a relatively high-cost feedstock.

There is a need for improved methods in the production of allulose that do not have the drawbacks and limitations of conventional methods.

BRIEF SUMMARY OF THE INVENTION

The present invention provides advantages over conventional methods and products. The present invention provides an efficient process that can convert readily available and lower cost feedstock, such as high fructose corn syrup ("HFCS"), to allulose. In an aspect of the present invention, a method comprises separating a mixture of allulose, fructose, and glucose and optionally gluco-oligosaccharides, wherein the separating comprises using simulated moving bed ("SMB") chromatography and recovering allulose at a high purity and yield. In an aspect, the SMB chromatography disclosed herein is ternary (also called "tertiary") chromatography that separates allulose from fructose and glucose in a first zone, while simultaneously separating fructose from glucose in a second zone.

In an aspect, a process for purifying allulose comprises contacting a chromatographic bed material with water and a mixture of allulose, fructose, and glucose, wherein the fructose is non-crystalline fructose, while simultaneously separating a fraction enriched with allulose from a fraction enriched with fructose and glucose by sorbent chromatography through the chromatographic bed material, while simultaneously separating a fraction enriched with fructose from a fraction enriched with glucose by sorbent chromatography through the chromatographic bed material.

In a particular embodiment there is a process for purifying allulose that includes, in a simulated moving bed apparatus comprising a plurality of column segments sequentially connected in series, and containing chromatographic bed material, simultaneously: a. feeding a mixture of fructose, dextrose, and allulose reaction product at a feed port position to contact the chromatographic bed material at a column segment in a first zone; b. feeding water into the apparatus at an eluent port position to contact the chromatographic bed material at a column segment in a second zone; c. flowing the water in a first direction toward the first zone to contact the mixture of fructose, dextrose, and allulose reaction product and moving the plurality of column segments in a second direction opposite the first direction; d. removing a first effluent enriched in the allulose reaction product from a product port positioned in the second zone upstream of the feed port position with respect to the first direction; e. removing a second effluent enriched in fructose from a first raffinate port position in the first zone downstream of the feed port with respect to the first direction; f. removing a third effluent enriched in dextrose from a second raffinate port position in a third zone downstream of the first raffinate port with respect to the first direction.

In an aspect, an allulose production system comprises:
  a. a vessel comprising an immobilized allulose epimerase, wherein when high fructose corn syrup contacts the immobilized allulose enzyme, the allulose epimerase converts fructose to allulose;
  b. a simulated moving bed apparatus comprising a plurality of column segments sequentially connected in series, and containing chromatographic bed material, wherein the plurality of column segments is located downstream of the vessel comprising the immobilized allulose epimerase;
  c. a feed port to receive a mixture of fructose, dextrose, and allulose from the vessel comprising the immobilized allulose epimerase, to contact the chromatographic bed material at a column segment in a first zone;
  d. an eluent port to receive water to contact the chromatographic bed material at a column segment in a second zone;
  e. wherein the simulated moving bed is configured to flow the water in a first direction toward the first zone to contact the mixture of fructose, dextrose, and allulose and move the plurality of column segments in a second direction opposite the first direction;

d. a product port positioned in the second zone upstream of the feed port position with respect to the first direction to remove a first effluent enriched in the allulose;

e. a first raffinate port to remove a second effluent enriched in fructose, wherein the first raffinate port is located in the first zone downstream of the feed port with respect to the first direction; and f. a second raffinate port to remove a third effluent enriched in dextrose, wherein the second raffinate port is located in a third zone downstream of the first raffinate port with respect to the first direction.

In an aspect, the process comprises contacting a chromatographic bed material comprising a resin with mixture comprising fructose, dextrose (also known as D-glucose), and an allulose reaction product. In an aspect, the mixture comprising fructose, dextrose, and the allulose reaction product is produced by enzymatic reaction of high fructose corn syrup with an immobilized epimerase to convert fructose in the syrup to the allulose reaction product. The method comprises separating a fraction enriched with the allulose reaction product from a fraction enriched with fructose and glucose, and separating a fraction enriched with fructose from a fraction enriched with dextrose. In an aspect, the fraction enriched with fructose has a greater volume than the fraction enriched with dextrose.

In an aspect, the fraction enriched with fructose may be recycled to the enzymatic reaction of high fructose corn syrup so that at least some of the recycled fructose is converted to allulose. A benefit of recycling the enriched fructose fraction in this manner is that the enriched fructose fraction does not need to be subjected to evaporation prior to the enzymatic reaction to convert fructose in the fraction to allulose.

In an aspect, the fraction enriched with dextrose may be recycled as a feedstock for an upstream fructose refining process wherein dextrose is converted to fructose. In an aspect, the upstream fructose refining process may be followed by a HFCS refining process. The HFCS refining process may produce a HFCS stream that may be used as a feedstock to the enzymatic reaction of high fructose corn syrup with an immobilized epimerase to convert fructose in the syrup to the allulose reaction product.

In an aspect, the chromatographic bed material is contained within a simulated moving bed apparatus. In certain embodiments, the simulated moving bed apparatus comprises a plurality of moveable column segments connected in sequential fluid series and includes a desorbent port to introduce water into the apparatus to contact the chromatographic bed material, a feed port to introduce a mixture of fructose, dextrose, and an allulose reaction product into the apparatus to contact the chromatographic bed material, a product port to remove high purity allulose from the apparatus, a port to remove a fraction enriched with fructose from the apparatus, and a port to remove a fraction enriched with dextrose from the apparatus. Typically, the column segments are sequentially connected in a circular series. In this embodiment, water and the mixture comprising fructose, dextrose, and allulose reaction product, are each introduced into the simulated moving bed apparatus and pass through the apparatus in a first flow direction and the column segments are collectively moved in a second direction opposite the first direction.

In another embodiment, the simulated moving bed apparatus comprises a plurality of column segments sequentially fluidly interconnected by moveable ports, wherein the moveable ports are a desorbent port to introduce water into the apparatus to contact the chromatographic bed material, a feed port to introduce a mixture of fructose, dextrose, and an allulose reaction product into the apparatus to contact the chromatographic bed material, a product port to remove high purity allulose from the apparatus, a port to remove a fraction enriched with fructose from the apparatus, and a port to remove a fraction enriched with dextrose from the apparatus. In this embodiment, the moveable ports are moved in a circular sequence relative to the column segments. Typically, water and the mixture comprising fructose, dextrose, and allulose reaction product, are each introduced into the simulated moving bed apparatus and pass through the apparatus in a first flow direction and the moveable ports are collectively moved to an adjacent column segments in the same direction to simulate movement of the bed segments in a second direction opposite the first direction.

In an aspect, there are provided methods for continuous production of high purity allulose by the foregoing simulated moving bed processes. These methods operate wherein the contacting of the chromatographic bed material with water and the mixture of fructose, dextrose, and allulose reaction product are conducted continuously with removal of high purity allulose enriched effluent.

In accordance with an aspect of the invention, the chromatographic bed material is an ion exchange resin. Examples of suitable chromatographic bed materials include, but are not limited to, resins that are strong acid cation resins. Examples of suitable strong acid cation resins include those sold by Dow Chemical Co. (Midland, Michigan), with product numbers Dowex99 Ca/320, Dowex99 Ca/310, and Dowex99 Ca/280; and those sold by Mitsubishi Chemical Co. (Tokyo, Japan), under the product name DIAION™.

In yet another aspect there is provided an allulose production facility comprising a simulated moving bed apparatus configured to operate any one of the processes provided herein. Such a facility will be characterized by having a simulated moving bed apparatus configured with ports directing a flow of water and tri-sugar feed stock simultaneously onto a chromatographic bed material, with simultaneous removal of allulose product and fructose and dextrose in different zones of the simulated moving bed apparatus.

These and other aspects, embodiments, and associated advantages will become apparent from the following Brief Description of the Drawings and the Detailed Description.

BRIEF DESCRIPTION OF THE DRAWINGS

The characteristics and advantages of the present disclosure may be better understood by reference to the accompanying figures.

DETAILED DESCRIPTION OF PREFERRED EMBODIMENTS

Prior to describing the present invention in detail, certain terms that have meanings generally understood by those of ordinary skill in the art are nevertheless defined herein to better distinguish nuances in meaning that may apply to different embodiments of the invention. It is understood that the definitions provided herein are intended to encompass the ordinary meaning understood in the art without limitation, unless such a meaning would be incompatible with the definitions provided herein, in which case the provided definitions control.

"Chromatographic Separation" and variations thereof refers to rate-based separation of chemical species over a stationary solid phase chromatographic sorbent material by differential partitioning of the species between the stationary phase and a mobile eluent phase. By "rate based separation" it is meant that a portion of each species is always moving with the mobile phase eluent but that a difference in partitioning rates between species results in a different rate of movement of species over the stationary phase thereby accomplishing a separation dependent on time and bed volume. Accordingly, chromatographic separation can be accomplished by the use of single mobile phase without a requirement to change eluent conditions. In this regard, chromatographic separation may be characterized as a "continuous separation process" because the species being separated are in continuous motion.

"Sorption" is a process by which a substance becomes physically associated with a substrate material by absorption or adsorption.

"Absorption" is a process in which molecules or ions of a substance become physically associated within a substrate material by becoming encumbered within a matrix of the substrate material i.e., the substrate material is an absorbent.

"Adsorption" is a process in which molecules or ions of substance become physically associated with a substrate material by adhering to the surface of the substrate, i.e., the substrate material is an adsorbent.

"Adsorptive/Desorptive Separation" or "Adsorptive/Desorptive Chromatography" and variations thereof are specifically meant to distinguish from chromatographic separation, and refers to a process where chemical species are separated by immobilizing one species on a solid phase sorbent while moving another species preferentially with the eluent under a first eluent condition, then changing eluent conditions to a second condition where the immobilized species is desorbed from the sorbent to preferentially partition with the eluent. Accordingly, the two features that fundamentally distinguish chromatographic separation from adsorptive/desorptive separation are that in the latter case (i) a first eluent condition is selected to accomplish, as near as possible, complete immobilization of at least one species on the chromatographic material, and (ii) there is a change to a second eluent condition selected to cause the immobilized species to become mobile. In this regard, adsorptive/desorptive separation may be characterized as a "discontinuous" or "stepwise" separation process.

The ordinarily skilled person will recognize that depending on eluent selection and chemical species, the same solid phase chromatographic material may be used to accomplish chromatographic separation, adsorptive/desorptive separation, or both. For example, in a first step to separate a mixture containing species A, B and C, an ion exchange material may be employed as a sorbent stationary phase in conjunction with an eluent at a first pH selected to cause species A and B to be immobilized on the sorbent while species C preferentially partitions with the mobile eluent phase thereby accomplishing adsorptive/desorptive separation of species A and B from species C. In a second step, the eluent conditions can be changed to a second pH that causes species A and B to preferentially partition with the moving phase. If the change in pH also causes species A and B to differentially partition between the mobile phase and the stationary phase, then species A and B will move at different rates over the stationary phase and be chromatographically separated on the same ion exchange material.

"Sorbent Separation" or "Sorbent Chromatography" and grammatical variations thereof, refer generally to the separation of chemical species using a solid phase sorbent material and at least one mobile phase eluent. These terms encompass both chromatographic separation and adsorptive/desorptive separation.

"Chromatographic Bed Material" "Chromatographic Sorbent" or "Stationary Phase," refer to a solid phase sorbent material used to separate chemical species by sorbent separation.

"Eluent" refers to a mobile phase of fluid passed over a chromatographic bed material to accomplish sorbent separation.

"Raffinate" is a general term that refers to the liquid effluent or fraction resulting from a separation procedure that is not enriched with the desired product allulose.

"Continuously Operating" or "Continuously Separating" in reference to use of a sorbent chromatographic separation process means that the process is conducted indefinitely over time with an uninterrupted input of reactants and/or eluent(s), with an uninterrupted withdrawal of product and/or raffinate, and if elected, with an uninterrupted flow of bed preparation material. In this regard, both adsorptive/desorptive separation and chromatographic separation can be continuously operated, with the difference being that in adsorptive/desorptive separation there is some section of the chromatographic bed subject to disconnection from the series so that it can be treated with a discrete discontinuous change in eluent conditions.

"Simultaneously continuously contacting" means that one or more segments of a fluidly interconnected chromatographic bed are contacted with at least two different substances at the same time so that the flow of one substance through the interconnected segments is continuous with the flow of at least another substance, which together contribute to the whole flow of substances over the interconnected portion of the bed. The term is meant to contrast with "stepwise contacting" where one or more segments are contacted with the different substances at different points in time whether portions of the bed are fluidly interconnected or not. The term is also intended to distinguish from "simultaneous discontinuous contacting," which is a situation where certain segments of chromatographic bed are not connected to one another (or are disconnected) so that even though different segments of the bed might be contacted with different substances at the same moment in time, the total flow of substances over the whole of the bed is not affected by the flow of substances in disconnected portions. This later situation is encountered when conducting continuous separation using adsorptive/desorptive chromatography.

"Non-crystalline fructose" means a solution containing fructose and water where the purify of the fructose in the solution is insufficient to form crystalline fructose by fructose crystallization techniques. Most typically non-crystalline fructose is less than 95% fructose on a weight dissolved solids basis.

Turning now to the invention, the disclosure that follows is based on the discovery of an efficient process to convert a readily available and lower cost feedstock, such as HFCS, to allulose and to separate a product effluent enriched with allulose from a raffinate effluent enriched in fructose. In an aspect, a method comprises separating a mixture of allulose, fructose, glucose, and gluco-oligosaccharides, wherein the separating comprises using simulated moving bed chromatography, and recovering allulose at a high purity and yield. In an aspect, the simulated moving bed ("SMB") chromatography comprises five (5) zones. In one aspect, the method provides separation of an allulose reaction product of allulose in high fructose corn syrup ("HFCS"). In another aspect, the method produces a highly enriched allulose product having a purity of at least 95% wt/wt of dissolved solids. In an aspect, the apparatus produces a highly enriched allulose product having a purity of at least 98% wt/wt of dissolved solids. In another aspect, the method produces a high purity fructose product having a purity of at least 80% wt/wt, preferably at least 88% wt/wt, and more preferably at least 90% wt/wt of dissolved solids that can be recycled to a column containing immobilized epimerase for further conversion of fructose to allulose in an enzymatic reaction (also referred herein as an allulose epimerase process). In a further aspect, the glucose obtained as the raffinate from the SMB chromatography apparatus, also called a glucose enriched fraction, may be recycled to glucose isomerase enzymatic reaction, e.g., to a column containing immobilized glucose isomerase, to convert a portion of the glucose to fructose and to produce more HFCS. In yet another aspect, the method produces a glucose enriched fraction that can be recycled to a glucose isomerase enzymatic reaction to convert a portion of the glucose to fructose.

In an aspect, each SMB chromatography zone comprises at least one chromatography column comprising a resin. In an embodiment, each column has the same dimensions and comprises the same resin. The first zone may be referred to as the feed zone, the second zone may be referred to as the desorbent zone, the third zone may be referred to as the dextrose enrichment zone (or split zone), the fourth zone may be referred to as the allulose enrichment zone, and the fifth zone may be referred to as the reload zone.

One aspect of the methods provided herein is use of a simulated moving bed chromatographic apparatus containing a chromatographic bed material to simultaneously separate the allulose enriched product from the fructose and dextrose enriched product, and to separate the fructose enriched product from the dextrose enriched products.

Simulated moving bed chromatographic apparatus containing ion exchange chromatographic bed materials have been used in the separation of hydrophilic products such as basic amino acids and acidic carboxylic acids from fermentation broths using polar ion exchange chromatographic bed materials. In these processes, the simulated moving bed apparatus is configured to perform the separation by absorptive/desorptive chromatography, which requires a discontinuity in connections to switch from a first eluent condition where the desired product is bound to the chromatographic bed and then to a second condition where the desired product desorbed from the bed. Although these are discontinuous separation techniques, simulated moving bed apparatus are typically mounted on a carousel, so that by appropriate use of valves and eluent streams at different stations, the process can be operated in a continuous manner.

While by absorptive/desorptive separation may be used in certain embodiments provided herein, more advantageous embodiments employ true simulated moving bed chromatographic separation. True simulated moving bed chromatographic separation, is a continuous chromatographic separation technique that uses the simulated moving bed apparatus to mimic the effect that would be observed if a fluid phase material containing species to be separated could be made stationary while a solid phase chromatographic material moved through the fluid phase. The effect would be to separate the species into different zones within the bed material based on their relative partitioning rates between the fluid phase and the bed material. This effect is mimicked by dividing the chromatographic bed material into fluidly interconnected sections and moving the interconnected sections in a counter current direction opposite to the direction of flow of feed material (and eluent if different from the feed material). The species that preferentially partition with the mobile fluid phase will thus preferentially move in one direction, while the species that preferentially partition with the solid phase will move in the opposite direction thus effecting a separation into different column segments representing the different zones.

When true simulated moving bed chromatography is operated in a continuous manner as provided in certain embodiments, with stepwise segment movement, input of feed and withdrawal of product from the different zones, a standing concentration gradient is established between the ends of the withdrawal zones, with one end being preferentially enriched with a first product species and the opposing end being an unseparated mixture, with intervening zones being preferentially enriched with other product species. When there is complete withdrawal of products from the different zones, or when an optional regeneration zone is used to wash or replenish a segment with an input eluent, the process can be run indefinitely to provide continuous separation and isolation of the multiple species from a feedstock without need for intervention.

In any simulated moving bed chromatographic apparatus, the chromatographic bed material contained in the apparatus is conceptually divided into zones, where each zone may be distinguished from the other zones by the fluid flow in the chromatographic bed material in that zone. Zones may also be distinguished, for example, by the effluent introduced or withdrawn in the zone or the dominant function that occurs within the zone. In certain embodiments where different fluids are applied in different zones, a gradient is established with increasing content of a first fluid and decreasing content of the second fluid and vice a versa in the opposite direction with respect to the position of the input zones.

In the typical simulated moving bed apparatus, the plurality of interconnected chromatographic bed segments is arranged in a sequential series and fluid ports are provided so that a feedstock, eluent or other mobile phase material may be introduced to, or withdrawn from, any selected segment or position in the apparatus. An arrangement of valves at the top and bottom of each segment directs the flow of fluids into and out of any number of interconnected segments in the same or different zones at flow rates that can be independently controlled. The column segments are typically arranged on a carousel type configuration that cycles the column segments in a circular movement of positions in discrete steps over the course of the cycle. In this construction, the ports in contact with the column segments at the top and bottom of each segment are stationary, so that the column segments cycle in a circular movement with respect to the stationary port. In a complete cycle, each column segment passes through each different position and set of stationary ports where different predominant functions are occurring. The function occurring at any given position remains constant and therefore the position of the segment conceptually designates its zone. In an alternative carousel construction, the column segments are stationary and the ports in contact with the column segments at the top and bottom of each column segment cycle in a circular movement with respect to the column segments. In a complete cycle, the movement of the ports causes each column segment to pass through each different position where different predominant functions are occurring. The function occurring at any given position remains constant and therefore the position of the segment conceptually designates its zone.

The number of chromatographic beds, columns or parts thereof connected in the series is unlimited. The present methods can be optimized by adjusting flow rates for input and withdrawal of fluids and the timing of segment (or port) movement to improve product yield. Another variable for optimizing the present method is the number of column segments used to define a zone in the series. Within the series, each zone can have an optimized number of column segments. Thus, while the Figures provided herein each depict an exemplary configuration with 12, 14 or 20 column segments for ease of description, the methods provided herein are not limited to a certain number of chromatographic devices. Within the series of columns segments, there are one or more segments defining the zones described above. Each zone may be defined by the number of column segments in which a separation of species occurs where a flow effluent is introduced or where a flow of effluent is removed. The method is therefore scalable to any practical dimension by one of ordinary skill in the art.

In an aspect, there is provided an allulose production facility comprising a simulated moving bed apparatus configured to operate any one of the processes provided herein. Such a facility will be characterized by having a simulated moving bed apparatus configured with ports directing a flow of a feed stock containing fructose, dextrose (i.e., D-glucose) and allulose simultaneously onto a chromatographic bed material, with simultaneous removal of allulose, fructose and dextrose enriched products in different zones of the simulated moving bed apparatus. The allulose production facility may be a part of, joined with, or incorporated into a high fructose corn syrup production facility in which dextrose is converted to a mixture comprising glucose and fructose by contacting a dextrose solution with glucose isomerase immobilized on a column. The allulose production facility preferably also contains allulose epimerase immobilized on a column that converts fructose to allulose by contacting high fructose corn syrup with the epimerase enzyme.

In an aspect, an apparatus comprises a water source, a sugar source, and simulated moving bed ("SMB") chromatography columns. The columns may comprise five (5) zones. In an aspect, the apparatus provides separation of an allulose reaction product from other sugars and oligosaccharides present in high fructose corn syrup ("HFCS"). In an aspect, the apparatus produces a highly enriched allulose product having a purity of at least 90% wt/wt of dissolved solids. In an aspect, the apparatus produces a highly enriched allulose product having a purity of at least 95% wt/wt of dissolved solids. In an aspect, the apparatus produces a highly enriched allulose product having a purity of at least 98% wt/wt of dissolved solids. In another aspect, the apparatus produces a high purity fructose product having a purity of at least 80% wt/wt, preferably at least 88% wt/wt, and more preferably at least 90% wt/wt of dissolved solids that can be recycled to a column containing immobilized epimerase for further conversion of fructose to allulose in an enzymatic reaction (also referred herein as an allulose epimerase process). In a further aspect the glucose obtained as the raffinate from the SMB apparatus may be recycled to a column containing immobilized glucose isomerase to produce more HFCS.

Figure 1:
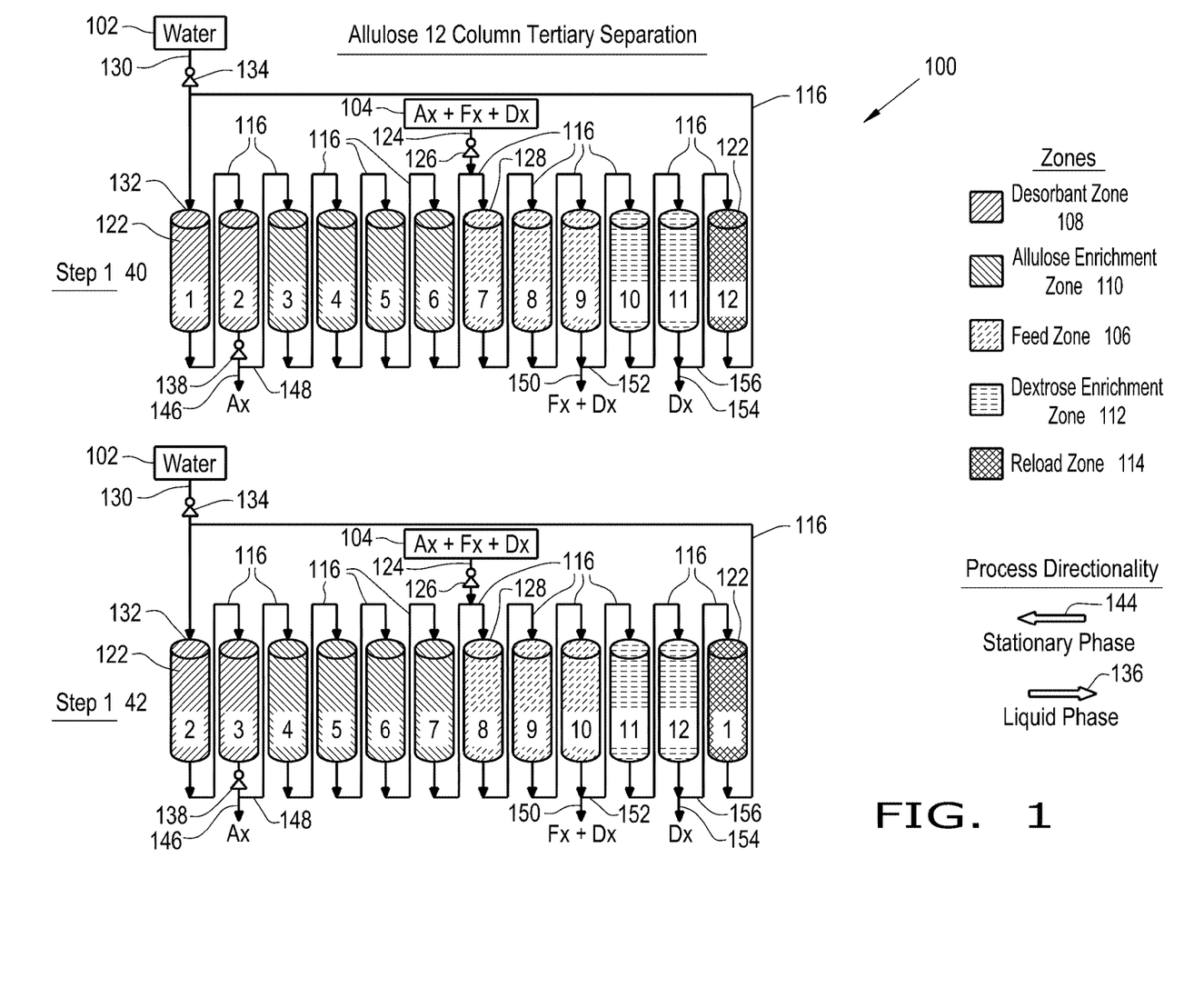
FIG. 1 is a schematic flow diagram of simulated moving bed chromatography, with twelve (12) columns, in accordance with aspects of the invention.

FIG. 1 illustrates an exemplary system for the practice of the methods provided herein. In this exemplary embodiment, simulated moving bed chromatography apparatus 100 comprises water source 102, mixed sugar source 104, and a SMB apparatus containing five (5) zones: feed zone 106, desorbent zone 108, allulose enrichment zone 110, dextrose enrichment zone 112, and reload zone 114. Apparatus 100 comprises a plurality of chromatography column segments 1-12, connected in sequential fluid series via conduits 116 to form a continuous chromatographic bed with each of the column segments 1-12 having a chromatographic bed material 122. The chromatographic bed material 122 is comprised of an ion exchange resin, most typically in the calcium form. Examples of suitable chromatographic bed materials include, but are not limited to, resins that are strong acid cation resins. Examples of suitable strong acid cation resins include those sold by Dow Chemical Co. (Midland, Michigan), with product numbers Dowex99 Ca/320, Dowex99 Ca/310, and Dowex99 Ca/280; and those sold by Mitsubishi Chemical Co. (Tokyo, Japan), under the product name DIAION™, with product numbers SK1B, SK104H, SK110, SK112 ("SK Series"), UBK530, UBK550, UBK535, UBK555 ("UBK500 Series").

Sugar source 104 may be used to supply a mixture 124 of allulose, fructose, and dextrose to feed zone 106. Mixture 124 may be produced by enzymatic reaction of high fructose corn syrup with an immobilized epimerase to convert fructose in the syrup to the allulose reaction product.

As shown in first step 140, the chromatographic bed material 122 is simultaneously and continuously contacted with: (i) mixture 124 containing allulose, fructose, and dextrose within the first zone, i.e., feed zone 106, with column segment 7 being the first column segment defining the feed zone 106 and (ii) with water 130 from water source 102 within a second zone, i.e., desorbent zone 108, at column segment 1 defining the first column of desorbent zone 108. Mixture 124 is introduced into the chromatographic bed material 122 via inlet port 128. Water 130 is introduced into the chromatographic bed material 122 via inlet port 132. The flow of these materials together accomplishes the separation by sorbent chromatography using water as the eluent.

In an embodiment, three pumps may be utilized to create an enrichment flow, a split flow, and a reload flow, further identified below, and two more pumps may be used to push feed and eluent (i.e., water) into the system. As shown in FIG. 1, pump 126 used to pump feed 124 into apparatus 100, and pump 134 is used to pump water 130 into apparatus 100. As shown in FIG. 1, pump 138 is used to create enrichment flow from desorbent zone 108 to allulose enrichment zone 110, pump 158 is used to create split flow from feed zone 106 to dextrose enrichment zone 112, and pump 160 is used to create reload flow from dextrose enrichment zone 112 to reload zone 114.

Water 130 pumped by pump 134 through inlet port 132 to push water 130 into apparatus 100 in first direction 136. As shown in FIG. 1, first direction 136 is the liquid phase direction shown in the legend under "Process Directionality." Effluent from desorbent zone 108 (i.e., the second zone) is pumped by pump 138 in first direction 136 toward feed zone 110 (i.e., the first zone) to contact mixture 124 of allulose, fructose, and dextrose. Mixture 124 is pumped in first direction 136 by pump 126. Pump 126 pumps mixture 124 to feed zone 106 (i.e., the first zone).

As shown in FIG. 1, second direction 144 is the stationary phase direction also shown in the legend under "Process Directionality." In an embodiment, step 142 is after step 140. As shown in step 142, columns 1-12 have been shifted in second direction 144. As shown in step 142, each column has been moved to location where an adjacent column was located in step 140. As shown in step 142, column 1 is now in the location where column 12 was previously located in step 140, column 12 is now in the location where column 11 was previously located in step 140, column 11 is now in the location where column 10 was previously located in step 140, column 10 is now in the location where column 9 was previously located in step 140, column 9 is now in the location where column 8 was previously located in step 140, column 8 is now in the location where column 7 was previously located in step 140, column 7 is now in the location where column 6 was previously located in step 140, column 6 is now in the location where column 5 was previously located in step 140, column 5 is now in the location where column 4 was previously located in step 140, column 4 is now in the location where column 3 was previously located in step 140, column 3 is now in the location where column 2 was previously located in step 140, and column 2 is now in the location where column 1 was previously located in step 140.

In an embodiment, first step 140 is followed by second step 142, and second step 142 is followed by subsequent steps (not shown in FIG. 1) wherein columns 1-12 are shifted multiple times until each column is back to its original location in first step 140. In an embodiment, each step takes place over the same period of time. In the embodiment shown in FIG. 1, upon completion of the twelfth step, each column has been located in every column location of apparatus 100, and one column rotation is completed. In an embodiment, the columns may be shifted more than twelve times. For example, the columns may be shifted thirty-seven (37) times, i.e., three complete rotations (twelve steps per rotation), so that on the thirty-seventh step, each column is in the same location as in first step 140.

As shown in FIG. 1, simulated moving bed chromatography apparatus 100 comprises a plurality of column segments 1-12 sequentially connected in series, and containing chromatographic bed material 122, simultaneously: a. feeding a mixture 124 of fructose, dextrose, and allulose at a feed port position, i.e., feed inlet port 128, to contact the chromatographic bed material 122 at a column segment in a first zone, i.e., feed zone 106; b. feeding water 130 into apparatus 100 at an eluent port position, i.e., inlet port 132, to contact the chromatographic bed material 122 at a column segment in a second zone, i.e., desorbant zone 108; c. flowing water 130 in a first direction 136 toward the first zone to contact the mixture 124 of fructose, dextrose, and allulose and moving the plurality of column segments 1-12 in a second direction 144 opposite first direction 136 (movement of column segments illustrated by column positions in step 140 and in subsequent step 142); d. removing a first effluent 146 enriched in the allulose reaction product from a product port 148 positioned in the second zone, i.e., desorbant zone 108, upstream of the feed port position, i.e., inlet port 128, with respect to first direction 136; e. removing a second effluent 150 enriched in fructose from a first raffinate port position, i.e., first raffinate port 152, in the first zone, i.e., feed zone 106, downstream of the feed inlet port 128 with respect to first direction 136; f. removing a third effluent 154 enriched in dextrose (also called D-glucose) from a second raffinate port position, i.e., second raffinate port 156, in a third zone, i.e., dextrose enrichment zone 112, downstream of the first raffinate port with respect to first direction 136.

Allulose will preferentially partition with the solid phase chromatographic bed material 122 by sorbent interaction. At discrete points in time the column segments 1-12 are simultaneously moved one step in a second direction 144, which is opposite (counter-current) to the first direction 136 of liquid phase flow. Because the allulose preferentially partitions with the solid phase chromatographic bed material 122, repeated periodic movement of the column segments 1-12 causes the allulose to preferentially move over the solid phase chromatographic bed material 122 in the second direction 144 toward the product port 148 shown in column segment 2 (in step 140) where allulose is removed from the chromatographic bed material 122. Because the allulose reaction product 146 is removed (desorbed) from the chromatographic bed material 122 at port 148, the column segments 3-6 between the port 148 and the feed inlet port 128 are designed as allulose enrichment zone 110. While the allulose reaction product 146 moves with the phase chromatographic bed material 122 in the second direction 144, the fructose and dextrose continues to move with the mobile liquid phase in the first direction 136, where the fructose enriched effluent 150 is removed from first raffinate port 152 shown in column 9 (in step 140), and the dextrose enriched effluent 154 is removed from second raffinate port 156 shown in column 11 (in step 140).

Figure 2:
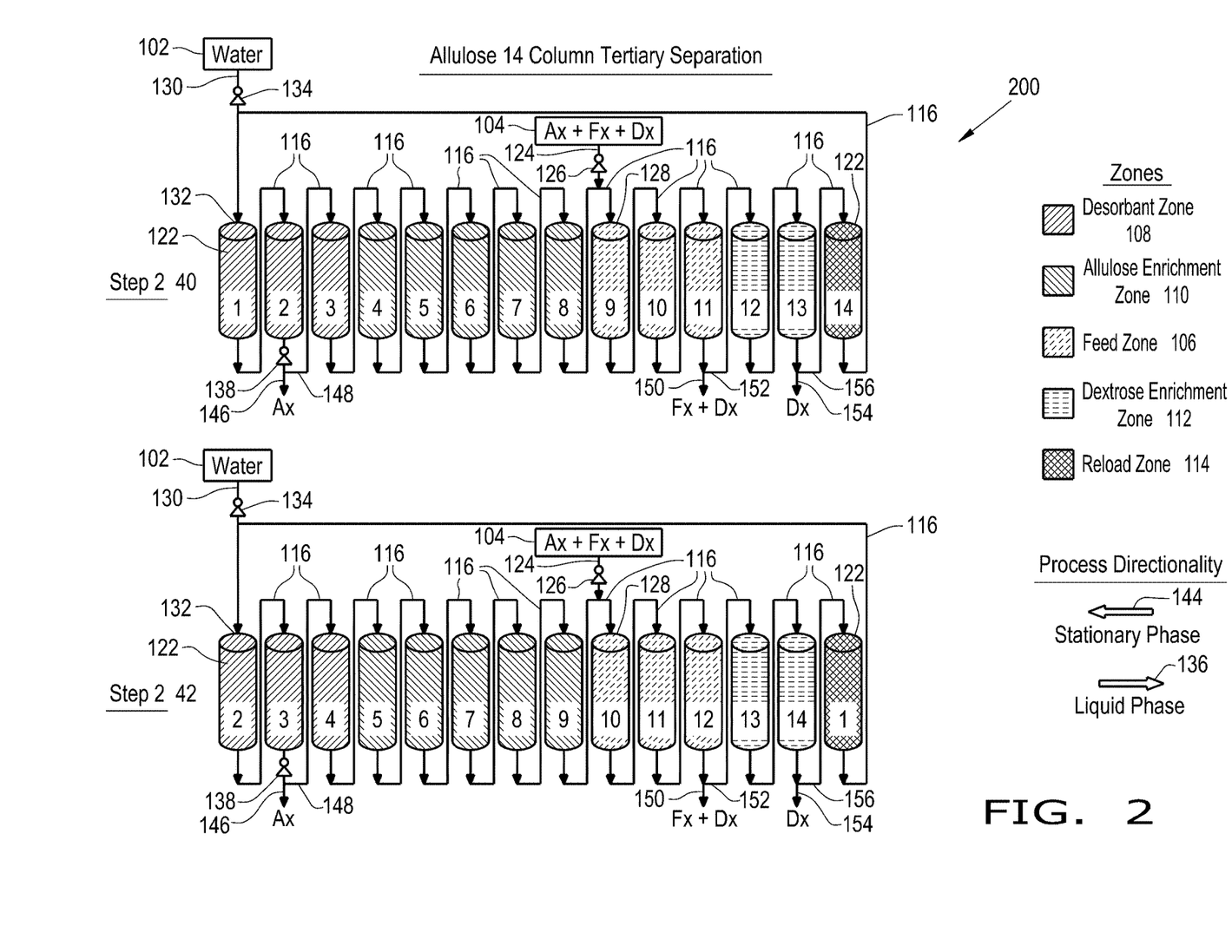
FIG. 2 is a schematic flow diagram of simulated moving bed chromatography, with fourteen (14) columns, in accordance with aspects of the invention.

FIG. 2 illustrates an exemplary system for the practice of the methods provided herein. methods a schematic flow diagram of simulated moving bed chromatography in accordance with aspects of the invention. In an embodiment, simulated moving bed chromatography apparatus 200 comprises column segments 1-14. Apparatus 200 differs from apparatus 100 shown in FIG. 1 in that apparatus has two additional column segments. Apparatus 200 has five column segments in allulose enrichment zone 110, whereas apparatus 100 has four column segments in allulose enrichment zone 110. Apparatus 200 has three column segments in desorbent zone 108, whereas apparatus 100 has two column segments in desorbent zone 108.

Figure 3:
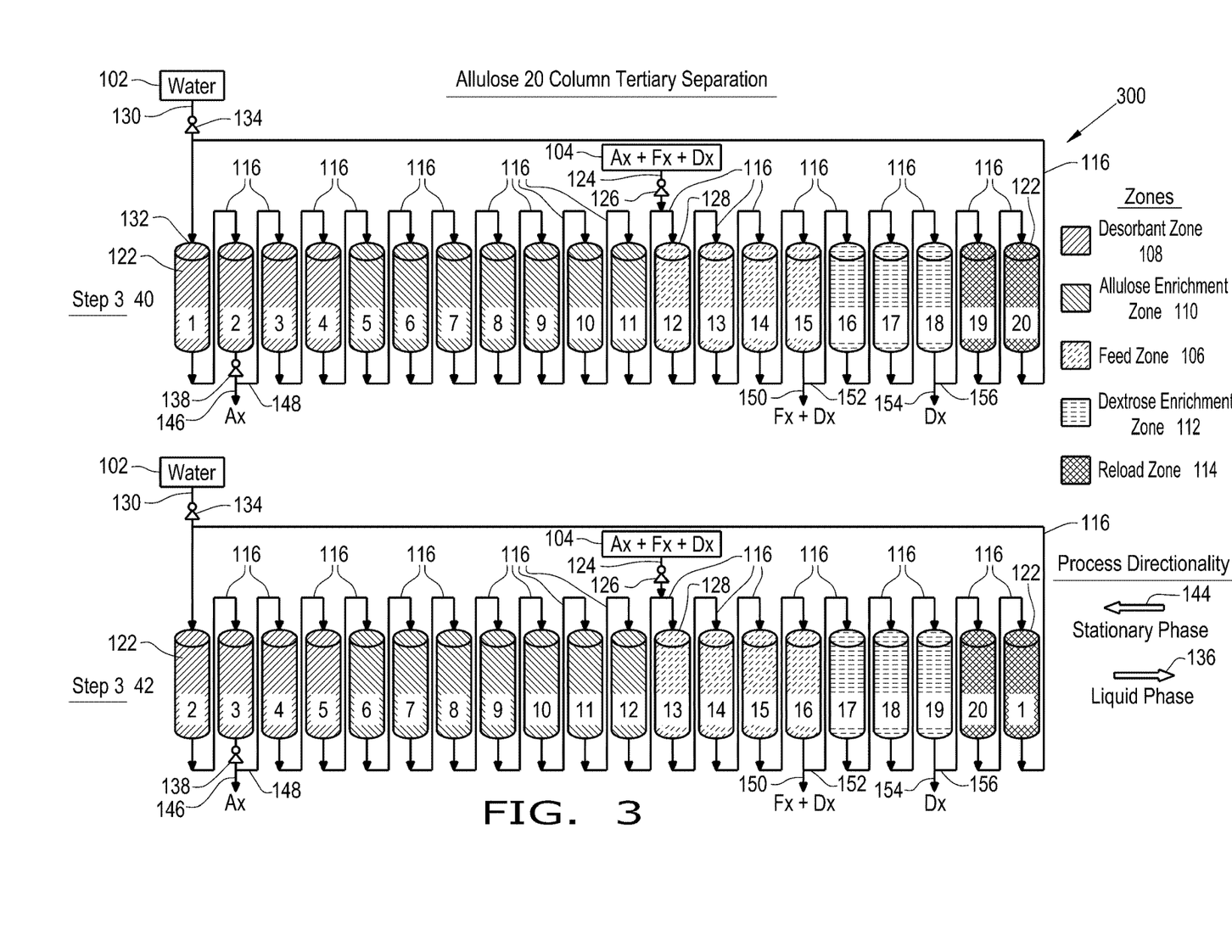
FIG. 3 is a schematic flow diagram of simulated moving bed chromatography, with twenty (20) columns, in accordance with aspects of the invention.

FIG. 3 illustrates an exemplary system for the practice of the methods provided herein. methods a schematic flow diagram of simulated moving bed chromatography in accordance with aspects of the invention. In an embodiment, simulated moving bed chromatography apparatus 300 comprises column segments 1-20 Apparatus 300 differs from apparatus 100 shown in FIG. 1 in that apparatus has eight additional column segments. Apparatus 300 has four column segments in feed zone 106, whereas apparatus 100 has three column segments in feed zone 106. Apparatus 300 has seven column segments in allulose enrichment zone 110, whereas apparatus 100 has four column segments in allulose enrichment zone 110. Apparatus 300 has four column segments in desorbent zone 108, whereas apparatus 100 has two column segments in desorbent zone 108. Apparatus 300 has three column segments in dextrose enrichment zone 112, whereas apparatus 100 has two column segments in dextrose enrichment zone 112. Apparatus 300 has two column segments in reload zone 114, whereas apparatus 100 has one column segment in reload zone 114.

In an alternative embodiment, each zone has a corresponding inlet valve for the inlet of water from water source 102, an inlet valve for the inlet of a sugar feed from sugar source 104, and an inlet valve for the inlet of feed from the immediate upstream column in the loop. The feed to the first column of each zone will change to simulate a moving bed. In FIG. 1, the arrow pointing right to left and identified as "Stationary phase" signifies that by opening and closing inlet valves and changing the type of feed to the first column of each zone in a particular manner, simulated movement of a moving bed is obtained, namely a simulated moving bed that rotates clockwise in circle, in other words, from left to right as shown in FIG. 1, even though the columns, and the resin in the columns do not move.

The exit stream from each column enters the top of the next downstream column, and all the columns are linked in a flow loop.

Sugar source 104 comprises a mixture of allulose ($A_x$), fructose ($F_x$) and dextrose ($D_x$). Dextrose ($D_x$) is also known as the D-form of glucose. Allulose is also known as psicose.

Figure 4:
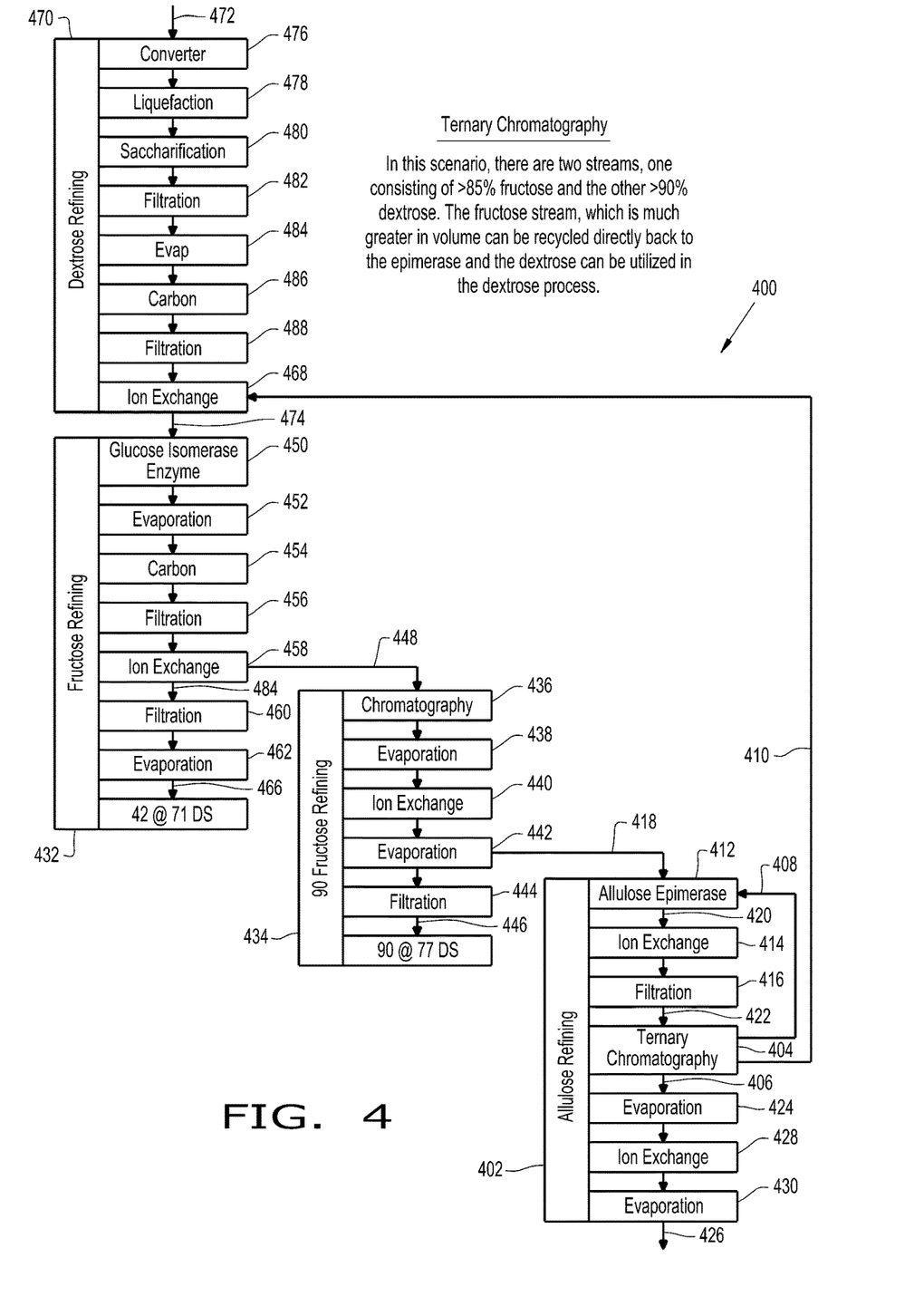
FIG. 4 is flow diagram illustrating production of allulose from HFCS in accordance with aspects of the invention.

FIG. 4 is a flow diagram illustrating production of allulose from glucose in a corn processing facility in accordance with aspects of the invention. Process 400 comprises allulose refining process 402 that includes the tertiary chromatographic separation process 404 using simulated moving bed (SMB) chromatography as described herein above and illustrated in FIGS. 1-3 which simultaneously results in the separation of an allulose enriched stream 406 from a fructose and glucose enriched stream (not shown in FIG. 4) and to separate a fructose enriched stream 408 from a glucose enriched stream 410. Those skilled in the art, having the benefit of this disclosure, will recognize that tertiary chromatography process 404 may be performed using any suitable apparatus, e.g., apparatus 100 of FIG. 1, apparatus 200 of FIG. 2, or apparatus 300 of FIG. 3. In addition to the allulose refining process 402, the overall process 400 also includes dextrose refining process 470 whereby dextrose is made by liquefaction of corn starch; fructose refining process 432, whereby dextrose is converted to HFCS having a fructose content of about 42% DS; and fructose enrichment process 434, whereby some HFCS is enriched to about 90% dissolved solids fructose, while some of the HFCS is subjected to allulose refining process 402.

As shown in FIG. 4, allulose refining process 402 may comprise allulose epimerase process 412, ion exchange process 414, and filtration process 416. In allulose epimerase process 412, HFCS feedstock 418 is placed in contact with a suitable epimerase enzyme to convert a portion of the fructose in the HFCS to allulose. In this aspect, in allulose epimerase process 412, mixture 420 emerging from the allulose epimerase process 412 comprises fructose, dextrose, and allulose produced by enzymatic reaction of HFCS feedstock 418 with an immobilized epimerase to convert a portion of the fructose in the syrup to the allulose reaction product. The immobilized epimerase used in allulose epimerase process 412 may be any suitable epimerase that converts fructose to allulose. Such suitable epimerases include, but are not limited to variants of *Burkholderia multivorans* CGD1 xylose isomerase engineered to have improved catalytic activity of about 1.5- to 2-fold compared with the parent enzyme, as disclosed in PCT/US19/45400 (filed Aug. 7, 2019), which is incorporated herein by reference. In ion exchange process 414 and filtration process 416, mixture 420 comprising fructose, dextrose, and the allulose reaction product may be processed to obtain filtered mixture 422 comprising fructose, dextrose and allulose.

In an embodiment, food grade magnesium sulfate may be added to HFSC feedstock 418 before HFCS 418 is conveyed to allulose epimerase process 412. The magnesium sulfate acts as a stabilizer for the epimerase. In ion exchange process 414, magnesium salt is removed from mixture 420 comprising fructose, dextrose, and allulose. In filtration process 416, entrained resin beads may be removed from mixture 420 to obtain filtered mixture 422 comprising fructose, dextrose, and the allulose reaction product.

As shown FIG. 4, filtered mixture 422 comprising fructose, dextrose and \ allulose reaction is conveyed to tertiary chromatography process 404. In tertiary chromatography process 404, filtered mixture 422 comprising fructose, dextrose (also known as D-glucose), and allulose are separated to produce allulose enriched stream 406, fructose enriched stream 408, and glucose enriched stream 410. In an aspect of the invention, fructose enriched stream 408 has a greater volume than glucose enriched stream 410.

As shown in FIG. 4, additional processes may be downstream of tertiary chromatography process 404. Allulose enriched stream 406 may be subjected to further processing to obtain allulose 426 from allulose enriched stream 406. Those skilled the art, having the benefit of the present disclosure, will recognize that any suitable processing may be used to obtain allulose 426 from allulose enriched stream 406. In an embodiment, such processing may comprise evaporation process 424 to evaporate water from allulose enriched stream 406, ion exchange processing 428, and evaporation process 430 after ion exchange processing 428 to further evaporate water from allulose enriched stream to obtain allulose 426. In an embodiment, evaporation process 424 may be used to increase the dry solids of allulose enriched stream 406 from about 10-15% DS to about 50% DS. Ion exchange process 428 may be used to remove color so that the allulose enriched stream 406 is clear or more clear. Evaporation process 430 may be used to increase the dry solids of allulose enriched stream 406 from about 50% DS to about 77% DS to obtain allulose 426. Allulose 426 may be characterized as an allulose syrup or 90 allulose @77 DS.

As shown in FIG. 4, the fructose enriched stream 408 may be recycled to the enzymatic reaction of high fructose corn syrup, i.e., allulose epimerase process 412, wherein recycled fructose may be converted to allulose. A benefit of recycling the fructose enriched steam 408 (also referred to herein as "enriched fructose fraction") in this manner is that the enriched fructose fraction does not need to be subjected to evaporation prior to the enzymatic reaction to convert fructose in the fraction to allulose.

As shown in FIG. 4, the glucose enriched stream 410 (also referred to herein as "enriched dextrose fraction") may be recycled as a feedstock for an upstream fructose refining process 432 wherein dextrose (also called D-glucose) is converted to HFCS. In an aspect, the upstream fructose refining process 432 may be followed by a fructose enrichment process 434 (labeled as "90 Fructose Refining" in FIG. 4).

As shown in FIG. 4, fructose enrichment process 434 may be used to convert HFCS stream 448 from fructose refining process 432 to a higher enriched fructose stream. Fructose enrichment process 434 may comprise chromatography process 436, evaporation process 438, ion exchange process 440, and evaporation process 442 to produce enriched fructose feedstock 418, which is then used as feedstock for allulose refining process 402. Those skilled in the art, having the benefit of the present disclosure, will recognize that chromatography process 436, evaporation process 438, ion exchange process 440, and evaporation process 442 are processes that may be used to produce enriched fructose 446, such as 90 HFCS @ 77 Dry Solids ("DS"), and that filtration process 444 may also be used as a polishing step after evaporation process 442 as shown in FIG. 4 to produce filtered 90 HFCS @ 77 ds, which may be used in certain commercial applications. Chromatography process 436 may be a binary chromatography process used to separate fructose from dextrose. Evaporation process 438 may be used to increase the dry solids from about 10-15% DS to about 50% DS in a fructose stream obtained from chromatography process 436. Ion exchange process 440 may be used to remove color from the fructose stream. Evaporation process 442 may be used to increase the dry solids from about 50% DS in the fructose stream to obtain HFCS feedstock 418, which may be characterized as 90 HFCS @ 77 DS.

As shown in FIG. 4, fructose refining process 432 may comprise glucose isomerase enzyme process 450, evaporation process 452, carbon process 454, filtration process 456, and ion exchange process 458 to produce fructose stream 448, which is then used as feedstock for fructose enrichment process 434. In glucose isomerase enzyme process 450, dextrose (i.e., D-glucose) is converted to fructose. Evaporation process 452 may be used to increase the dry solids in the stream comprising fructose from glucose isomerase enzyme process 450. Carbon process 454 may be a process using granulated carbon to remove off flavors and smells. Filtration process 456 may be used to remove undesirable particulates. Ion exchange process 458 may be used to remove color. Fructose stream 448 may be conveyed from ion exchange process 458 to chromatography process 438 of fructose refining process 434.

As shown in FIG. 4, fructose refining process 432 may comprise filtration process 460 and evaporation process 462 to convert a stream 464 from ion exchange process 458 to produce 42 HFCS @71 DS, identified in FIG. 4 as stream 466. Stream 466, i.e., 42 HFCS @71 DS may be used in certain commercial applications.

As previously discussed, glucose enriched stream 410 may be recycled as a feedstock for an upstream fructose refining process 432 wherein dextrose (also known as D-glucose) is converted to fructose for production of HFCS. In the embodiment shown in FIG. 4, glucose enriched stream 410 may be conveyed to ion exchange process 468 of dextrose refining process 470. Those skilled in the art, having the benefit of the present disclosure, will recognize that dextrose refining process 470 may convert corn starch 472 to a dextrose feedstock stream 474, which may then be converted to fructose stream 448 as discussed above.

Those skilled in the art, having the benefit of the present disclosure, will recognize that dextrose refining process 470 may comprise converter process 476, liquefaction process 478, saccharification process 480, filtration process 482, evaporation process 484, carbon process 486, and filtration process 488, in addition to and upstream of ion exchange process 468 previously discussed herein. Ion exchange process 468 may be used to remove ions that may impair the enzyme in glucose isomerase enzyme process 450. Converter process 476 may convert corn starch 472 to a globular liquifactant. Liquefaction process 478 may comprise addition of water and acid further solubilize starch, and saccharification process 480 may include alpha amylase and glucoamylase to convert solubilized starch to dextrose. Filtration process 482 may be used to remove un-solubilized starch. Evaporation process 484 may be used to increase the dry solids, carbon process 486 may be a process using granulated carbon to remove off flavors and smells. Filtration process 488 may be used to remove undesirable particulates from the process stream before the process stream is conveyed to ion exchange process 468.

As discussed above, aspects of the invention include SMB chromatography that is ternary (also called "tertiary") chromatography that separates allulose from fructose and glucose, and then separates fructose from glucose. It was found that in a binary chromatography process wherein allulose is separated from a mixture of fructose and D-glucose (i.e., dextrose), and the mixture of fructose and D-glucose is recycled to ion exchange process 468 and then to glucose isomerase enzyme process 450, the reprocessing of the mostly D-glucose mixture of fructose and D-glucose decreases the glucose isomerase productivity because of a high concentration of fructose in the mixture. It was found that this decrease in glucose isomerase productivity substantially reduces the efficiency of processing corn starch to HFCS and HFCS to allulose.

It has been discovered that the productivity of the glucose isomerase enzyme process 450 can be increased by using SMB chromatography that is ternary chromatography to separate fructose enriched stream 408 from glucose enriched stream 410, and recycling only the glucose enriched stream 410 to ion exchange process 468 and then to glucose isomerase enzyme process 450 as part of dextrose feedstock stream 474. By using SMB chromatography that is ternary chromatography, a stream comprising greater than 85% DS weight fructose by weight is obtained (i.e., fructose enriched stream 408), and another stream (i.e., glucose enriched stream 410) comprising greater than 90% DS wt dextrose is obtained. The fructose enriched stream 408 has a greater volume than the glucose enriched stream 410. By recycling the fructose enriched stream 408 directly back to the allulose epimerase process 412 and recycling only glucose enriched stream 410 to ion exchange process 468 and then to glucose isomerase enzyme process 450 as part of dextrose feedstock stream 474, the overall process is much more efficient. In an aspect, fructose enriched stream 408 is the same as fructose enriched effluent 150 shown in FIGS. 1-3 and described above.

To summarize, in accordance with aspects of the invention, dextrose refining process 470 converts corn starch to dextrose feedstock stream 474, fructose refining process 432 converts dextrose feedstock stream 474 to HFCS stream 448, fructose enrichment process 434 converts HFCS stream 448 to 90% enriched fructose feedstock stream 418, and allulose refining process 402 converts the enriched fructose feedstock stream 418 to allulose 426 and glucose enriched stream 410 with recycling of fructose enriched stream 408 (having unconverted fructose) to the allulose epimerase process 412 for further conversion of fructose to allulose.

The present invention is more particularly illustrated by the examples which follow.

Example 1

A pilot SMB was plumbed to the configuration as shown in FIG. 1. The resin used was a resin for chromatographic separation of sugars having a strong acid cation in a styrene-DVB, gel matrix, and a sulfonate functional group, specifically Dowex Monosphere™ 99 Ca/320. Column volume was measured to be about 331 mL per column. Three pumps were utilized to create the enrichment flow, the split flow and the reload flow and two more pumps were used to push feed and desorbent into the system.

To test this experiment, a pre-weighed container of allulose syrup made from HFCS 90 (concentration of allulose was 18-20% on a dry solids basis) for feed and the same with DI water for the desorbent. The process previously described was performed. Specifically, the system was allowed to reach equilibrium by shifting the column segments thirty-seven (37) times, i.e., three complete rotations (twelve steps per rotation), so that on the thirty-seventh step, each column was in the same location as in first step 140.

After the system had been allowed to reach equilibrium, the feed and desorbent were connected to the inlets of the feed and desorbent pumps and the three outlets were set to collect into pre-weighed containers. The system was then allowed to run for 55.2 minutes and then all containers were weighed, and samples were sent to analytical for analysis. Over the course of the 55.2 minutes, six steps of 9.2 minutes per step were performed. The bed volume in Table 1 below refers to volume of resin per column.

TABLE 1

|  |  | Run #1 | Run #2 | Run #3 | Run #4 | Run #5 | Run #6 |
|---|---|---|---|---|---|---|---|
| Feed (ml/min) | | 6.1 | 6.1 | 6.1 | 6.1 | 6.1 | 6.1 |
| Desorb (ml/min) | | 32 | 32 | 32 | 32 | 32 | 36 |
| Enrich (ml/min) | | 26.5 | 26.5 | 26.5 | 26.5 | 26.5 | 26 |
| Reload (ml/min) | | 17 | 17 | 17 | 17 | 17 | 17 |
| Split (ml/min) | | 25 | 24 | 25 | 25 | 25 | 25 |
| Step time (min) | | 9.2 | 9.2 | 9.2 | 9.2 | 9.2 | 9.2 |
| Bed Volume (ml) | | 331 | 331 | 331 | 331 | 331 | 331 |
| f1 | (Desorb + Reload)*t/V | 1.36 | 1.36 | 1.36 | 1.36 | 1.36 | 1.47 |
| f2 | Enrich*t/V | 0.74 | 0.74 | 0.74 | 0.74 | 0.74 | 0.72 |
| f3 | (Feed + Enrich)*t/V | 0.91 | 0.91 | 0.91 | 0.91 | 0.91 | 0.89 |
| f4 | Reload*T/V | 0.47 | 0.47 | 0.47 | 0.47 | 0.47 | 0.47 |
| f5 | Split*t/V | 0.69 | 0.67 | 0.69 | 0.69 | 0.69 | 0.69 |
| Water:Feed | | 5.25 | 5.25 | 5.25 | 5.25 | 5.25 | 5.90 |
| Allulose | yield | 98.3 | 98.4 | 94.6 | 95.7 | 98 | 97 |
| | purity | 99.6 | 97.4 | 95.4 | 96.6 | 97.5 | 93 |
| Fructose | yield | 92.4 | 96.8 | 93.5 | 94.3 | 90.3 | 88.5 |
| | Purity | 90.5 | 89.8 | 89 | 89.1 | 88 | 88.3 |
| Dextrose | yield | 39.8 | 32.5 | 37.1 | 36.1 | 30.5 | 37 |
| | purity | 47.8 | 68.5 | 57.6 | 57.8 | 31.7 | 59.2 |

In Table 1 above, (i) "feed" is the flow of mixture 124 of allulose reaction product, fructose, and dextrose to first zone, i.e., feed zone 106; (ii) "desorb" is the flow of water 130 from water source 102 to a second zone, i.e., desorbent zone 108; (iii) "enrich" is the flow from desorbent zone 108 to allulose enrichment zone 110; (iv) "reload" is the flow from dextrose enrichment zone 112 to reload zone 114; and (v) "split" is the flow from feed zone 106 to dextrose enrichment zone 112.

In Table 1, f1 through f5 are flow velocities, wherein f1 was the flow velocity through desorbent zone 108, f2 was the flow velocity through allulose enrichment zone 110, f3 was the flow velocity through feed zone 106, f4 was the flow velocity through dextrose enrichment zone 112, and f5 was the flow velocity through reload zone 114.

Example 2

Table 2 shows the performance of 12-column bed configuration (FIG. 1), 14-column bed configuration (FIG. 2), and 20-column bed configuration (FIG. 3), all using ternary chromatography process 404 (FIG. 4) and recycling of fructose enriched stream 408 to allulose epimerase process 412 and recycling of glucose enriched stream 410 to ion exchange process 468 (upstream of fructose refining process 432). In Table 2, "dsb" means dry solids basis.

In an aspect, dextrose (also called D-glucose) may be removed from allulose refining process 402 as glucose enriched stream 410. In an aspect, glucose enriched stream 410 is the same as dextrose enriched effluent 154 as shown in FIGS. 1-3. The process may be run wherein the raffinate, i.e., dextrose enriched effluent 154, may be more than 50%, and more preferably at least about 87% dextrose (also called D-glucose) by weight (and not counting DPs, more closely to 85% by weight dextrose). By removing dextrose in this manner using ternary chromatography, the dextrose enriched effluent 154 may become pure enough to be recycled as glucose enriched stream 410 for enzyme conversion of dextrose to fructose. By recycling the fructose enriched stream 408 directly back to the allulose epimerase process 412, and recycling only glucose enriched stream 410 to ion exchange process 468 and then to glucose isomerase enzyme process 450, the overall process is much more efficient than a process using binary chromatography wherein, after removal of allulose, all of the raffinate is recycled upstream to ion exchange process 468 and then to glucose isomerase enzyme process 450.

Table 2 shows that a 20-column bed configuration (FIG. 3), with ternary chromatography process 404 of the present invention wherein 90% HFCS was used as the feedstock to the allulose epimerase process, resulted in a raffinate stream (i.e., glucose enriched stream 410) of 2.9 ml/minute. As shown in Table 2, a 10-column bed configuration, using a binary chromatography process wherein highly purified dissolved crystalline fructose was used as the feedstock to the allulose epimerase process, resulted in a raffinate stream of 15.6 ml/minute. Thus, the 20-column bed configuration (FIG. 3), with ternary chromatography process 404, had more than 81% less raffinate than the 10-column bed with a binary chromatography process.

As shown in Table 2, a 14-column bed configuration (FIG. 2), with ternary chromatography process 404 of the present invention wherein 90% HFCS was used as the feedstock to the allulose epimerase process, resulted in a raffinate stream (i.e., glucose enriched stream 410) of 3.0 ml/minute, and thus, more than 80% less raffinate than the 15.6 ml/minute raffinate from using the 10-column bed configuration, with a binary chromatography process wherein highly purified dissolved crystalline fructose was used as the feedstock to the allulose epimerase process.

As shown in Table 2, a 12-column bed configuration (FIG. 1), with ternary chromatography process 404 of the present invention wherein 90% HFCS was used as the feedstock to the allulose epimerase process, resulted in a raffinate stream (i.e., glucose enriched stream 410) of 7.0 ml/minute, and thus, more than 55% less raffinate than the 15.6 ml/minute raffinate from using the 10-column bed configuration, with a binary chromatography process wherein highly purified dissolved crystalline fructose was used as the feedstock to the allulose epimerase process.

TABLE 2

|  | Binary Chromatography 10-column bed | Ternary Chromatography 12-column bed | Ternary Chromatography 14-column bed | Ternary Chromatography 20-column bed |
|---|---|---|---|---|
| Feed Composition | | | | |
| Allulose (% dsb) | 20.2 | 24.7 | 24.7 | 24.7 |
| fructose (% dsb) | 79.8 | 65.4 | 65.4 | 65.4 |
| Dextrose (% dsb) |  | 7.1 | 7.1 | 7.1 |
| Run data | | | | |
| Allulose (% dsb) | 99.9 | 99.6 | 99.6 | 99.2 |
| Fructose (% dsb) | 98.5 | 90.5 | 88.9 | 90.2 |
| Dextrose (% dsb) | n/a | 52.7 | 85.2 | 95.6 |
| Allulose yield (%) | 99 | 98.3 | 98.2 | 98.7 |
| Fructose yield (%) | 99 | 92.4 | 95.2 | 99.6 |
| Feed (ml/min) | 6.1 | 6.1 | 6.1 | 6.5 |
| Desorb (mil/min) | 32 | 32.0 | 13.4 | 12.3 |
| Allulose (ml/min) | 22.5 | 22.5 | 9.6 | 9.2 |
| Fructose recycle to allulose epimerase process(ml/min) | n/a | 8.6 | 6.9 | 6.7 |
| Raffinate recycle to ion exchange process upstream of fructose refining process (ml/min) | 15.6 | 7.0 | 3.0 | 2.9 |

As described above, the invention disclosed herein provides a process wherein ternary SMB chromatography is used to produce from a sugar solution separate allulose enriched, fructose enriched, and dextrose enriched streams. In accordance with aspects of the disclosure, allulose syrup and HFCS can be made from the same separations system. The process is capable of making 85%+ HFCS and 90% allulose syrup. Operating below these parameters would create an unusable allulose syrup for most commercial applications.

Those having skill in the art, with the knowledge gained from the present disclosure, will recognize that various changes can be made to the disclosed processes in attaining these and other advantages, without departing from the scope of the present disclosure. As such, it should be understood that the features of the disclosure are susceptible to modifications and/or substitutions. The specific embodiments illustrated and described herein are for illustrative purposes only, and not limiting of the invention as set forth in the appended claims.

What is claimed is:

1. A process for purifying allulose comprising:
contacting a chromatographic bed material with water and a mixture of allulose, fructose, and glucose wherein the fructose is non-crystalline fructose, and separating a fraction enriched with allulose from a fraction enriched with fructose and glucose by sorbent chromatography through the chromatographic bed material, while simultaneously separating a fraction enriched with fructose from a fraction enriched with glucose by sorbent chromatography through the chromatographic bed material;
wherein the chromatographic bed material is contained within a simulated moving bed apparatus;
wherein the simulated moving bed apparatus comprises a plurality of moveable column segments connected in sequential fluid series and including in order, an eluent port to introduce water into the simulated moving bed apparatus to contact the chromatographic bed material, a product port to remove the fraction enriched with allulose from the simulated moving bed apparatus, a feed port to introduce the mixture of allulose, fructose, and glucose into the simulated moving bed apparatus to contact the chromatographic bed material, a first raffinate port to remove the fraction enriched with fructose from the simulated moving bed apparatus, and a second raffinate port to remove the fraction enriched with glucose from the simulated moving bed apparatus.

2. The process of claim 1 wherein the sorbent chromatography comprises a continuous chromatographic separation.

3. The process of claim 1 wherein the sorbent chromatography comprises adsorptive/desorptive separation.

4. The process of claim 1, wherein the column segments are sequentially connected in a circular series.

5. The process of claim 4, wherein the water flows through the simulated moving bed apparatus in a first flow direction and the column segments are collectively moved in a second direction opposite the first direction.

6. A process for purifying allulose comprising:
contacting a chromatographic bed material with water and a mixture of allulose, fructose, and glucose wherein the fructose is non-crystalline fructose, and separating a fraction enriched with allulose from a fraction enriched with fructose and glucose by sorbent chromatography through the chromatographic bed material, while simultaneously separating a fraction enriched with fructose from a fraction enriched with glucose by sorbent chromatography through the chromatographic bed material;
wherein the chromatographic bed material is contained within a simulated moving bed apparatus;
wherein the simulated moving bed apparatus comprises a plurality of column segments sequentially fluidly interconnected by moveable ports that include in order, an eluent port to introduce water into the simulated moving bed apparatus to contact the chromatographic bed material, a product port to remove the fraction enriched with allulose from the simulated moving bed apparatus, a feed port to introduce the mixture of allulose, fructose, and glucose into the simulated moving bed apparatus to contact the chromatographic bed material, a first raffinate port remove the fraction enriched with fructose from the simulated moving bed apparatus, and a second raffinate port to remove the fraction enriched with glucose from the simulated moving bed apparatus.

7. The process of claim 6 wherein the moveable ports are moved in a circular sequence relative to the column segments.

8. The process of claim 6 wherein the water is introduced into the simulated moving bed apparatus in a first flow direction and the moveable ports are collectively moved to adjacent column segments in the same direction to simulate movement of chromatographic bed segments in a second direction opposite the first direction.

9. The process of claim 1, wherein the contacting of the chromatographic bed material with the water and mixture of allulose, fructose, and glucose with simultaneous sorbent chromatographic separation are conducted continuously with removal of the fraction enriched with allulose, removal of the fraction enriched with fructose, and removal of the fraction enriched with glucose.

10. A process for purifying allulose comprising:
   contacting a chromatographic bed material with water and a mixture of allulose, fructose, and glucose wherein the fructose is non-crystalline fructose, and separating a fraction enriched with allulose from a fraction enriched with fructose and glucose by sorbent chromatography through the chromatographic bed material, while simultaneously separating a fraction enriched with fructose from a fraction enriched with glucose by sorbent chromatography through the chromatographic bed material;
   wherein the mixture of allulose, fructose, and glucose is contacted with the chromatographic bed material in a first zone and the allulose is withdrawn from a second zone different than the first zone and upstream of the first zone with respect to the direction of flow of water;
   contacting the chromatographic bed material with the water in the second zone;
   removing the fraction enriched with fructose from a third zone downstream of the first zone with respect to the direction of the flow water; and
   recycling the fraction enriched with fructose, after removal from the first zone, to contact an allulose epimerase to convert the fructose to allulose, wherein the allulose epimerase is located upstream of the chromatographic bed material.

11. The process of claim 10 further including removing the fraction enriched with glucose from a fourth zone, wherein the third zone is located downstream of the third zone with respect to a flow direction of the water and flow of the mixture of allulose, fructose, and glucose.

12. The process of claim 11 further including recycling the fraction enriched with glucose, after removal from the fourth zone, to contact a glucose isomerase enzyme to convert the glucose to fructose, wherein the glucose isomerase enzyme is located upstream of the allulose epimerase.

13. The process of claim 12 wherein the fraction enriched with fructose has a greater volume than the fraction enriched with dextrose.

14. A process for purifying allulose that includes, in a simulated moving bed apparatus comprising a plurality of column segments sequentially connected in series, and containing chromatographic bed material, simultaneously:
   a. feeding a mixture of fructose, dextrose, and allulose at a feed port position to contact the chromatographic bed material at a column segment in a first zone;
   b. feeding water into the apparatus at an eluent port position to contact the chromatographic bed material at a column segment in a second zone;
   c. flowing the water in a first direction toward the first zone to contact the mixture of fructose, dextrose, and allulose and moving the plurality of column segments in a second direction opposite the first direction;
   d. removing a first effluent enriched in the allulose from a product port positioned in the second zone upstream of the feed port position with respect to the first direction;
   e. removing a second effluent enriched in fructose from a first raffinate port position in the first zone downstream of the feed port with respect to the first direction; and
   f. removing a third effluent enriched in dextrose from a second raffinate port position in a third zone downstream of the first raffinate port with respect to the first direction.

15. An allulose production facility comprising a simulated moving bed apparatus configured to operate the process of claim 1.

16. An allulose production facility comprising a simulated moving bed apparatus configured to operate the process of claim 14.

17. A fructose corn syrup/allulose production facility comprising a simulated moving bed apparatus configured to operate the process of claim 12.

* * * * *